United States Patent
Kim (10) Patent No.: US 8,594,687 B2
(45) Date of Patent: Nov. 26, 2013

(54) BASE STATION FOR OPERATING COOPERATIVE MULTI-POINTS TRANSMISSION AND RECEPTION (COMP)

(75) Inventor: Hyung-sub Kim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 393 days.

(21) Appl. No.: 12/851,130

(22) Filed: Aug. 5, 2010

(65) Prior Publication Data

US 2011/0143793 A1    Jun. 16, 2011

(30) Foreign Application Priority Data

Dec. 15, 2009  (KR) .......................... 10-2009-0124342

(51) Int. Cl.
    *H04W 72/00*    (2009.01)
(52) U.S. Cl.
    USPC .......................................... 455/450; 455/443
(58) Field of Classification Search
    USPC ............ 455/101, 115.1, 114.2, 450; 370/431, 370/338, 312, 260
    See application file for complete search history.

(56) References Cited

U.S. PATENT DOCUMENTS

| | | | |
|---|---|---|---|
| 2006/0133403 A1* | 6/2006 | Chun et al. | 370/431 |
| 2010/0027456 A1* | 2/2010 | Onggosanusi et al. | 370/312 |

FOREIGN PATENT DOCUMENTS

| | | |
|---|---|---|
| KR | 10-2009-0073975 | 7/2009 |
| KR | 1020090077185 | 7/2009 |
| KR | 1020090098921 | 9/2009 |

* cited by examiner

*Primary Examiner* — Tu X Nguyen
(74) *Attorney, Agent, or Firm* — Nelson Mullins Riley & Scarborough LLP

(57) ABSTRACT

Provided is a base station for operating a Cooperative Multi-Points Transmission and Reception (CoMP). A base station of a serving cell may perform scheduling according to an Inter-cell Interference Coordination (ICIC) scheme from a point in time when a service is provided to a user equipment (UE). When a Precoding Matrix Index (PMI) coordination is required, the base station of the serving cell may perform the PMI coordination in interoperation with a neighboring cell. In addition, when a status of the UE satisfies a particular condition, the base station of the serving cell may perform the aforementioned ICIC scheme and the PMI coordination. Also, the base station of the serving cell may perform the aforementioned ICIC scheme and the PMI coordination together.

8 Claims, 8 Drawing Sheets

FIG. 8

BASE STATION FOR OPERATING COOPERATIVE MULTI-POINTS TRANSMISSION AND RECEPTION (COMP)

CROSS-REFERENCE TO RELATED APPLICATION

This application claims the benefit of Korean Patent Application No. 10-2009-0124342, filed on Dec. 15, 2009, in the Korean Intellectual Property Office, the disclosure of which is incorporated herein by reference.

BACKGROUND

1. Field of the Invention

The present invention relates to a base station for operating a Cooperative Multi-Points Transmission and Reception (CoMP), and more particularly, to a base station for operating a CoMP that may enhance a quality of service (QoS) of a user equipment by employing an Inter-cell Interference Coordination (ICIC) scheme and a Precoding Matrix Index (PMI) coordination technology.

2. Description of the Related Art

Currently, a multiple access scheme of a mobile communication system is being switched from a code division multiple access (CDMA) scheme to an orthogonal frequency division multiplexing (OFDM) scheme. Compared to the CDMA scheme, the OFDM scheme may enhance a system throughput by decreasing interference between users existing within the same cell. However, even though the inter-user interference decreases compared to the CDMA scheme, inter-cell interference occurring from a neighboring cell may not decrease. The inter-cell interference may be one of the biggest causes deteriorating the system throughput.

SUMMARY

An aspect of the present invention provides a base station for operating a Cooperative Multi-Points Transmission and Reception (CoMP) that may enhance a quality of service (QoS) of a user positioned in a central portion or an outer portion of a particular cell by decreasing inter-cell interference.

According to an aspect of the present invention, there is provided a base station for operating a CoMP, including: a first Radio Resource Manager (RRM) to determine a frequency boundary divided into a central portion and an outer portion of a cell according to an Inter-cell Interference Coordination (ICIC) scheme; and a first Media Access Control (MAC) layer to estimate position information of a user equipment, and to assign, to the user equipment, a frequency band divided according to the ICIC scheme. When a QoS of the user equipment decreases to be less than or equal to a predetermined threshold, the first RRM may determine a Precoding Matrix Index (PMI) coordination for the user equipment.

The base station may further include: a first Radio Resource Control (RRC) layer to receive, from the first RRM, a notice that the PMI coordination is determined to be performed, and to transmit PIM information to be used by the user equipment to each of base stations included in neighboring cells of the cell.

When each of the base stations included in the neighboring cells determines to perform the PMI coordination, the first MAC layer may adjust a scheduling policy associated with a resource to be used by the user equipment.

The first RRM may determine whether to perform the PMI coordination by comparing a QoS threshold used to determine the QoS with a CoMP threshold used to prevent the QoS from decreasing to be less than or equal to the QoS threshold.

According to another aspect of the present invention, there is provided a base station for operating a CoMP, including: a second RRC layer to receive, from a serving cell, PMI information to be used by a user equipment of the serving cell; and a second RRM to calculate a QoS expectation value by temporarily performing a PMI coordination with respect to user equipments positioned within a cell based on the received PMI information, and to determine whether to perform the PMI coordination based on the calculated QoS expectation value.

The second RRM may transfer, to the second RRC layer, a notice that the PMI coordination is determined to be performed, and the second RRC layer may notify the serving cell about that the PMI coordination is determined to be performed.

When at least one of calculated QoS expectation values of the user equipments is less than a reference value, the second RRM may determine to not perform the PMI coordination.

When a notice that the PMI coordination is determined to be performed is received from the second RRM, the serving cell may modify a scheduling policy of the user equipment of the serving cell.

According to still another aspect of the present invention, there is provided a base station for operating a CoMP, including: a third MAC layer to assign a frequency to all the user equipments positioned within a cell; a third RRM to calculate an average QoS of user equipments positioned in an outer portion of the cell, and to determine, based on the calculated average QoS, whether gain occurs when an ICIC is performed in the cell; and a third RRC layer to control the third MAC layer to adjust the scheduling policy by applying the ICIC when the gain is determined to occur.

When the third RRM determines the gain occurs, the third RRC layer may inquire base station positioned around the cell about whether to perform the ICIC.

When a QoS of one of the user equipments decreases to be less than or equal to a predetermined threshold after performing the ICIC, the third RRM may determine to perform a PMI coordination.

When an agreement with respect to the PMI coordination is received from a neighboring cell of the cell, the third MAC layer may adjust a scheduling policy associated with a resource to be used by the user equipments.

According to yet another aspect of the present invention, there is provided a base station for operating a CoMP, including: a fourth RRC layer to receive, from a serving cell, an inquiry about whether to perform an ICIC; a fourth RRM to determine whether gain occurs when the ICIC is performed based on the received inquiry, and to notify a fourth RRC layer about that the ICIC starts when the gain is determined to occur; and the fourth MAC layer to receive, from the fourth RRM, a notice that the ICIS starts.

The fourth MAC layer may transmit a response that agrees with starting of the ICIC.

The fourth MAC layer may further receive, from the serving cell, PMI information to be used by a user equipment of the serving cell. The fourth RRM may calculate a QoS expectation value by simulating a PMI coordination with respect to user equipments positioned within a current cell based on the received PMI information, and may determine whether to perform the PMI coordination based on the calculated QoS expectation value.

According to a further another aspect of the present invention, there is provided a base station for operating a CoMP, including: a fifth MAC layer to verify a position of a user equipment positioned within a cell, whenever the user equipment requests a service, and to assign a frequency to the user equipment according to an ICIC technology; and a fifth RRM to determine PMI information to be used by the user equipment when the frequency is assigned to the user equipment.

The base station may further include a fifth RRC layer to transmit the calculated PMI information to base stations of neighboring cells of the cell, and to receive, from the base stations of the neighboring cells, a response about whether to perform a PMI coordination based on the PMI information.

When at least one of the base stations of the neighboring cells determines to not perform the PMI coordination, the PMI coordination for the user equipment may not be performed.

According to still another aspect of the present invention, there is provided a base station for operating a CoMP, including: a sixth RRC layer to receive, from a serving cell, PMI information to be used by a user equipment of the serving cell whenever the user equipment requests a service; and a sixth RRM to calculate a QoS expectation value by simulating a PMI coordination with respect to user equipments positioned within a current cell based on the received PMI information, and to determine whether to perform the PMI coordination based on the calculated QoS expectation value.

When at least one of calculated QoS expectation values of the user equipments positioned within the current cell is less than or equal to a reference value, the PMI coordination may be determined to not be performed.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, embodiments of the present invention will be described in detail with reference to the accompanying drawings. When it is determined detailed description related to a related known function or configuration they may make the purpose of the present invention unnecessarily ambiguous in describing the present invention, the detailed description will be omitted here. Also, terms used herein are defined to appropriately describe the exemplary embodiments of the present invention and thus may be changed depending on a user, the intent of an operator, or a custom. Accordingly, the terms must be defined based on the following overall description of this specification.

Figure 1:
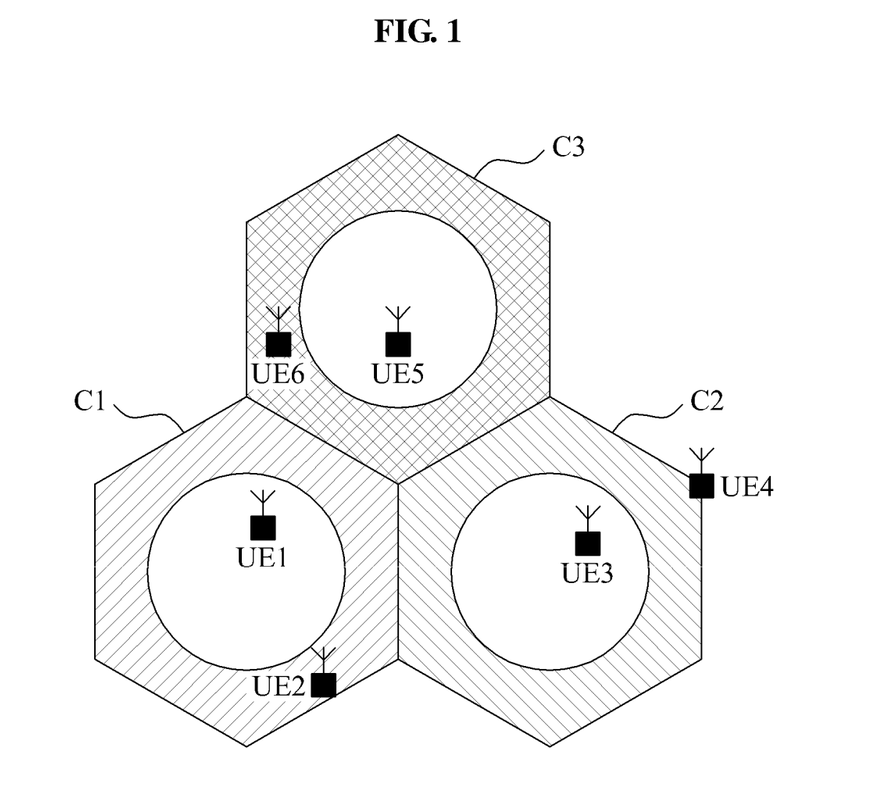
FIG. 1 is a diagram illustrating a communication system according to an embodiment of the present invention.

FIG. 1 is a diagram illustrating a communication system according to an embodiment of the present invention.

According to an embodiment of the present invention, to enhance a quality of service (QoS) of a user equipment positioned in an outer portion of a cell by mitigating inter-cell interference, it is possible to apply a Cooperative Multi-Points Transmission and Reception (CoMP) technology.

The CoMP technology denotes a dynamic scheduling technology that may use an Inter-cell Interference Coordination (ICIC) technology and a Precoding Matrix Index (PMI) coordination technology. The ICIC technology corresponds to an algorithm that may enhance a throughput by decreasing interference occurring between different neighboring cells. A PMI may be, for example, beamforming used in a system employing a multiple input multiple output (MIMO) communication scheme. The PMI coordination technology may perform coordination in order to cancel interference occurring when the same frequency is used in different cells.

Hereinafter, an operation procedure for effectively applying the CoMP technology, a function block for the operation procedure, and the like will be described using embodiments of the present invention.

Referring to FIG. 1, each of cells C1, C2, and C3 may be classified into a central portion and an outer portion. A first user equipment (UE1), a third user equipment (UE3), and a fifth user equipment (UE5) may be positioned in the central portion of the respective cells C1, C2, and C3. A second user equipment (UE2), a fourth user equipment (UE4), and a sixth user equipment (UE6) may be positioned in the outer portion of the respective cells C1, C2, and C3. A user equipment (UE) may be a communicable terminal such as a mobile phone, a lap top, a notebook, and the like.

As shown in FIG. 1, the ICIC technology may be applicable to, for example, a system employing a fractional frequency reuse (FFR) scheme. In a system where the ICIC technology of the FFR scheme is applied, there is a constraint on an available frequency band depending on whether each of the UE1, the UE2, the UE3, the UE4, the UE5, and the UE6 is positioned in a central portion or an outer portion of a corresponding cell.

All the UE1, the UE3, and the UE5 positioned in the central portion may be scheduled with respect to all of frequency bands of the system. However, the UE2, the UE4, and the UE6 positioned in the outer portion may use only a portion of frequency bands within a non-overlapping range, in order to avoid mutual interference.

Embodiments of operating the CoMP technology in the system of FIG. 1 will be described, and may refer to a Radio Resource Control (RRC) layer, a Media Access Control (MAC) layer, and a Radio Resource Manager (RRM) of performing a radio resource management function in a base station.

Figure 2:
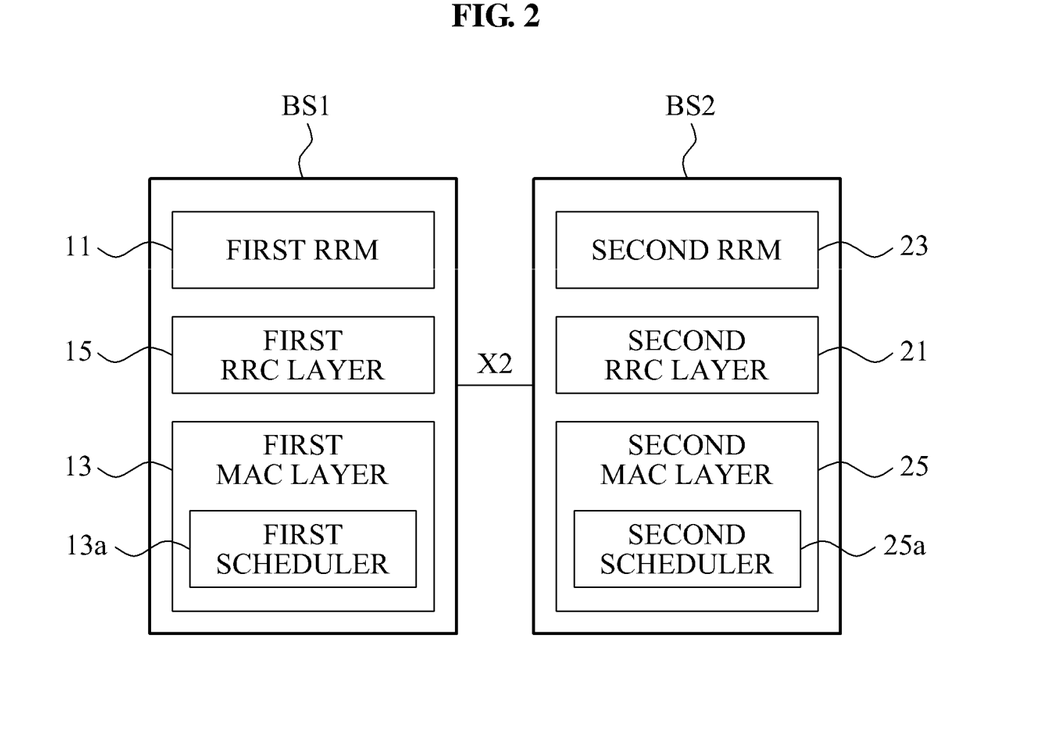
FIG. 2 is a block diagram illustrating a function division between a first base station and a second base station for operating a Cooperative Multi-Points Transmission and Reception (CoMP) according to an embodiment of the present invention.

FIG. 2 is a block diagram illustrating a function division between a first base station (BS1) and a second base station (BS2) for operating a CoMP according to an embodiment of the present invention.

Referring to FIG. 2, blocks 11 and 13 may indicate radio protocol layers, and a block 15 may indicate a functional object of a control plane. For ease of description, the radio protocol layer and the function object will be co-used. Also, a function of the BS1 may be performed by the BS2, and a function of the BS2 may be performed by the BS1.

The BS1 may be positioned in the cell C1, and may assign a frequency resource for providing a service from a point in time when a service is provided to the UE1 and the UE2, that is, from beginning. The assigned frequency resource may be limited depending on a position of the UE1 and the UE2 according to the aforementioned FFR scheme.

The BS1 may include a first RRM 11, a first MAC layer 13, and a RRC layer 15.

Figure 3:
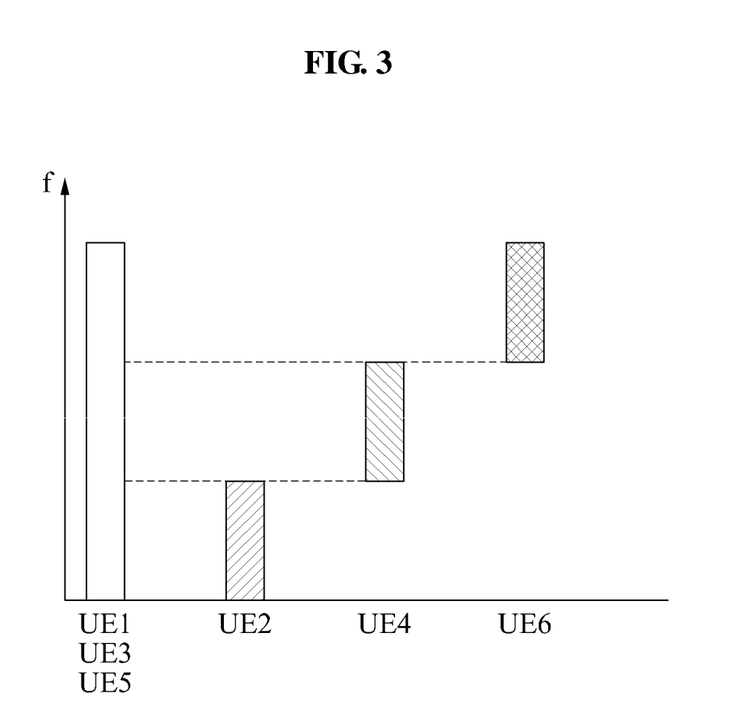
FIG. 3 is a diagram to describe an example of determining a frequency boundary according to an embodiment of the present invention.

As shown in FIG. 3, the first RRM 11 may determine a frequency boundary for dividing each of the cells C1, C2, and C3 into the central portion and the outer portion according to an FFR ICIC scheme, and then may divide a frequency f based on the frequency boundary. This is to enhance an efficiency in a load distribution within a single cell and a subsequent PMI coordination operation.

The first MAC 13 may perform mapping between a logic channel and a transmission channel, and may provide a service to a Radio Link Control (RLC) layer (not shown) that is an upper layer via the logic channel. In particular, a first scheduler 13a of the first MAC layer 13 may estimate position information of the UE1 and the UE2 within the cell C1, and may assign a divided frequency according to a defined ICIC. Specifically, the first MAC layer 13 may assign, to each of the UE1 and the UE2, a frequency that is set based on the estimated position information.

An existing ICIC scheme defines information exchange using a message between RRC layers, with respect to a frequency band to be used by a UE positioned in an outer portion where interference is received from an external cell. Here, the information may be associated with a resource to be used, and a request to not use the corresponding resource. The message may corresponds to an X2 message, and be transmitted and be received between base stations. However, an FFR scheme proposed by the present invention defines, for each cell, a frequency to be available in a central portion and an outer portion for each cell, and thus there is no need to transmit and receive a message. Specifically, since an existing transmitting and receiving operation is omitted, it is possible to decrease an amount of time used for an algorithm operation, a mathematical decision, and the like.

As described above, to divide a frequency based on a boundary using the first RRM 11, and to schedule a frequency resource, a time resource, and the like using the first MAC layer 13 may correspond to scheduling according to the ICIC scheme proposed by the present invention. Here, the term "scheduling" indicates assigning of a frequency or a time depending on a position of a UE.

Even though a UE is scheduled according to the ICIC scheme, a QoS of the UE may be deteriorated. In FIG. 1, the UE1, the UE3, and the UE5 positioned in the central portion may use all the frequency bands. Accordingly, based on a decrease in a QoS of a UE positioned in a central portion, it is possible to induce that interference from a UE positioned in a central portion of another neighboring cell exists. In this case, according to an embodiment of the present invention, it is possible to use a PMI coordination technology in addition to the ICIC scheme.

A physical meaning of PMI may be interpreted as beamforming of radio waves transmitted to a particular UE. UEs using the same PMI may form a stronger radio wave with respect to a resource of a particular frequency band and thereby enhance a QoS.

Figure 4:
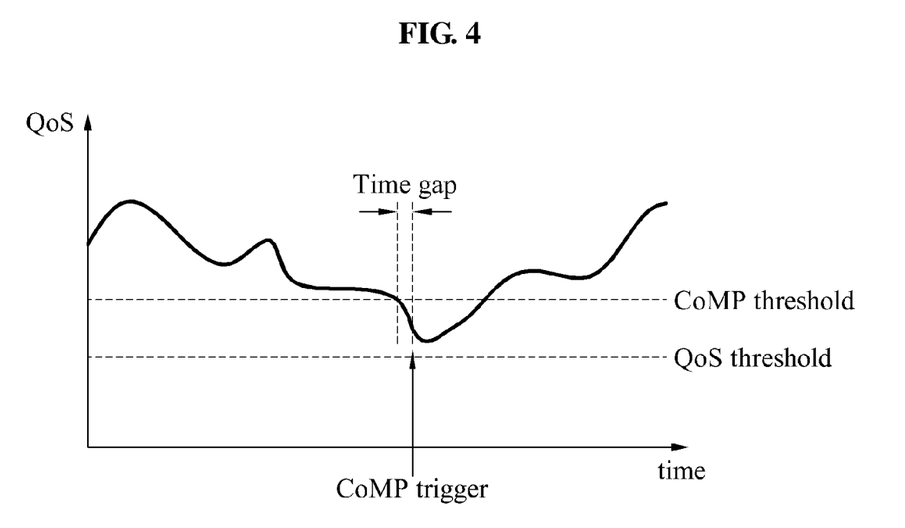
FIG. 4 is a diagram to describe a condition for performing a Precoding Matrix Index (PMI) coordination for a user equipment according to an embodiment of the present invention.

FIG. 4 is a diagram to describe a condition for performing a PMI coordination for a UE according to an embodiment of the present invention.

Referring to FIG. 4, two thresholds for CoMP UE may be defined in a first base station (BS1). Specifically, a QoS threshold and a CoMP threshold may be defined in the first RRM 11. The QoS threshold denotes a threshold used to determine a QoS of a UE, for example, the UE1. The CoMP threshold denotes a threshold used to prevent the QoS from being less than or equal to the QoS threshold. When whether to perform the PMI coordination is determined using only the QoS threshold, the QoS of the UE1 may decrease to be less than or equal to a predetermined threshold. To prevent this, the CoMP threshold may be used.

When the QoS of the UE1 decreases to be less than or equal to the CoMP threshold, the first RRM 11 may verify the QoS of the UE1 during a predetermined period of time. This is because the QoS may temporarily decrease. When the QoS maintains to be less than or equal to the CoMP threshold during the predetermined period of time, the first RRM 11 may determine to perform the PMI coordination for the UE1, and may determine the UE1 as a CoMP UE.

The CoMP technology may include the ICIC scheme and the PMI coordination. A UE to which the above logic is applied may correspond to the CoMP UE. The CoMP UE may be scheduled with respect to only a limited frequency domain, and may trigger the PMI coordination.

When a CoMP is determined to be performed with respect to the UE1, the first RRM 11 may inform the first RRC layer 15 within a corresponding base station, for example, the BS 1 about PMI information. The PMI information may include a PMI desired to be used by the UE1 determined as the CoMP UE, or a PMI of which a use from a neighboring cell is requested to be refrained. Specifically, the first RRM 11 may limit the use by informing the neighboring cell about a PMI causing significant interference in the CoMP UE, or may request the neighboring cell to use a PMI where interference barely exists by informing the neighboring cell about the corresponding PMI.

The first RRC layer 15 may control a logic channel, a transmission channel, and a physical channel associated with configuration, reconfiguration, and release of a radio bearer. Also, the first RRC layer 15 may receive, from the first RRM 11, a notice that the PMI coordination is determined to be performed, and may transmit, to base stations of neighboring cells using the X2 message, PMI information informed by the first RRM 11.

When each of the base stations of the neighboring cells including the cells C2 and C3 determines to perform the PMI coordination, the first MAC layer 13 may adjust a scheduling policy associated with a use of the same resource as the frequency of the UE1. Hereinafter, the PMI coordination will be described based on the cell C2 among the neighboring cells including the cells C2 and C3, and the BS2 positioned within the cell C2.

Referring to FIG. 2, the BS2 corresponding to the neighboring cell may include a second RRC layer 21, a second RRM 23, and a second MAC layer 25.

The second RRC layer 21 may receive, from a serving cell, for example, the cell C1, PMI information associated with the UE1. The second RRC layer 21 may transfer the received PMI information to the second RRM 23.

Figure 5:
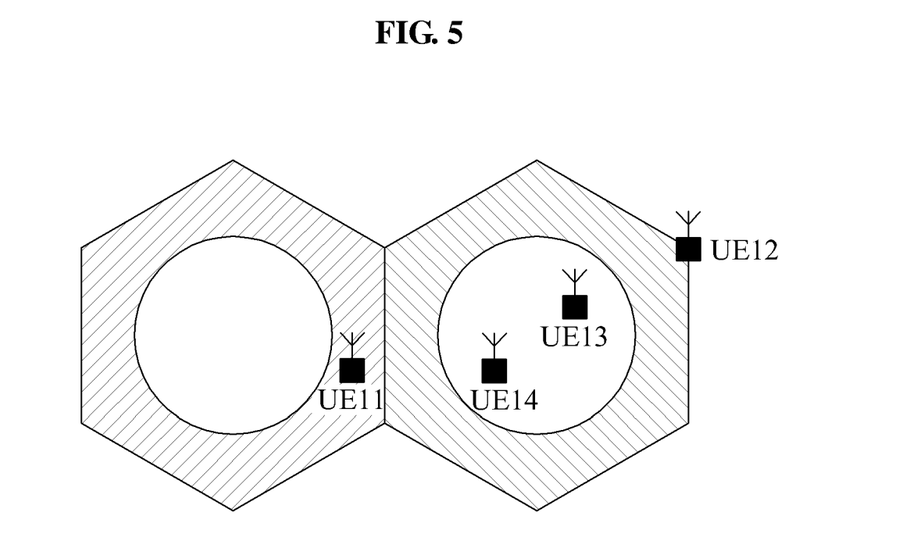
FIG. 5 is a diagram illustrating an example of a user equipment positioned for each cell according to an embodiment of the present invention.

The reason why the BS2 does not perform the CoMP immediately after receiving the X2 message will be described with reference to FIG. 5. An eleventh UE (UE11), a twelfth UE (UE12), a thirteenth UE (UE13), and a fourteenth UE (UE14) may be positioned as shown in FIG. 5, and the UE11 may correspond to a CoMP UE. When a PMI coordination is performed by the UE11, a QoS of the UE13 and the UE14 within a neighboring cell capable of using the same frequency may be deteriorated due to a PMI constraint. Since there is no overlapping frequency band between the UE11 and the UE12, a QoS of the UE12 may not be affected.

Figure 6:
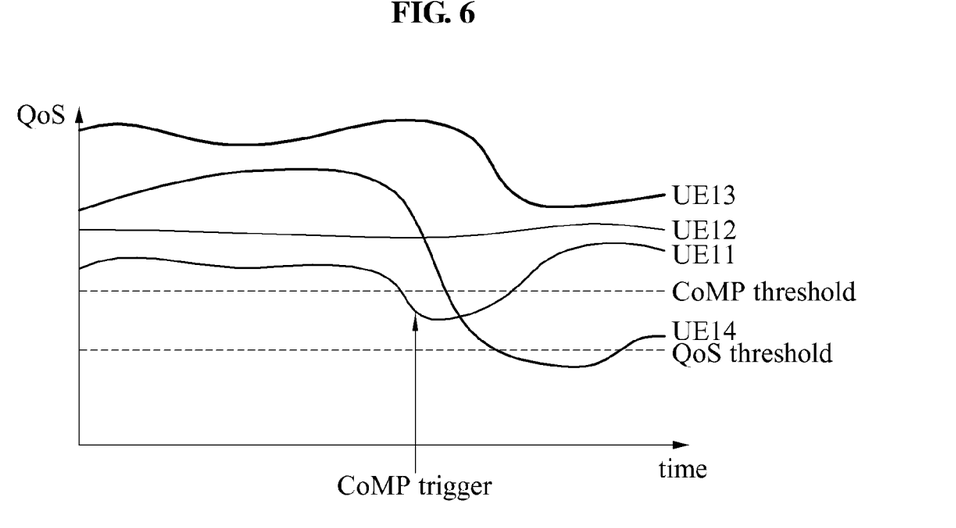
FIG. 6 is a diagram illustrating a quality of service (QoS) of each user equipment based on a PMI constraint according to an embodiment of the present invention.

FIG. 6 is a diagram illustrating a QoS of each UE based on a PMI constraint according to an embodiment of the present invention.

Referring to FIG. 6, even though a PMI is limited by the UE11, a QoS of the UE13 of FIG. 5 may be maintained to be relatively high. However, a QoS of the UE14 may decrease to be less than or equal to a QoS threshold. Specifically, for the UE11, the UE14 positioned within the central portion of the cell may be sacrificed. That the PMI is limited indicates that scheduling is not performed with respect to a PMI requested from the serving cell to not use. This is because a large amount of interference may occur due to the PMI.

Accordingly, to prevent the above case, a neighboring cell receiving the X2 message may temporarily perform the PMI coordination using the second RRM 23. The second RRM 23 may calculate a QoS expectation value by temporarily performing the PMI coordination with respect to the UE3 and the UE4 positioned in the cell C2. The second RRM 23 may determine whether to perform the PMI coordination based on the calculated QoS expectation value.

In particular, the second RRM 23 may calculate a QoS expectation value of each of the UE3 and the UE4 positioned within the central portion of the cell C2 by performing the PMI coordination. When a corresponding QoS is determined to be not affected based on the calculated QoS expectation value, the second RRM 23 may determine to perform the PMI coordination.

When the second RRM 23 determines to perform the PMI coordination, the second RRM 23 may transfer the decision result to a second scheduler 25a of the second MAC layer 25. The second scheduler 25a may modify a scheduling policy based on the transferred decision result.

The second RRM 23 may also transfer, to the second RRC layer 21, the decision that the PMI coordination is determined to be performed. The second RRC layer 21 may transmit the above result to the base station of the serving cell, for example, the BS1 of the cell C1 that has initially requested a review on the PMI coordination.

When at least one of the calculated QoS expectation values is less than or equal to a reference value, the second RRM 23 may determine to not perform the PMI coordination. The second RRM 23 may transfer the decision result to the second RRC layer 21, instead of transferring the decision result to the second scheduler 25a of the second MAC layer 25.

The second RRC layer 21 may transmit the result transferred from the second RRM 23, to the BS1 of the serving cell C1 including the CoMP UE. Specifically, the first RRC layer 15 of the BS1 may receive, from the second RRC layer 21, a notice that the PMI coordination is determined to be performed.

When all the neighboring cells including the cells C2 and C3 respond to perform PMI, the first RRC layer 15 may transfer, to the first scheduler 13a in a standby status, a notice that the PMI coordination is determined to be performed.

The first scheduler 13a may modify a scheduling policy of the UE1 determined as the CoMP UE according to the transferred decision. Specifically, the first scheduler 13a may assign, to the UE1, a PMI minimizing interference, a frequency, or a time.

Accordingly, a frequency may be assigned to each UE of the serving cell, for example, the cell C1 according to the ICIC scheme. When a particular condition that a QoS of a particular UE is less than a predetermined threshold during a predetermined period of time occurs, the PMI coordination may be performed.

According to the aforementioned embodiment, when a constraint on a frequency band occurs with respect to a UE corresponding to an ICIC interval and a PMI coordination is triggered with respect to the same UE, a constraint on a particular PMI may occur in a neighboring cell. Accordingly, it is possible to enhance a QoS of the UE.

Figure 7:
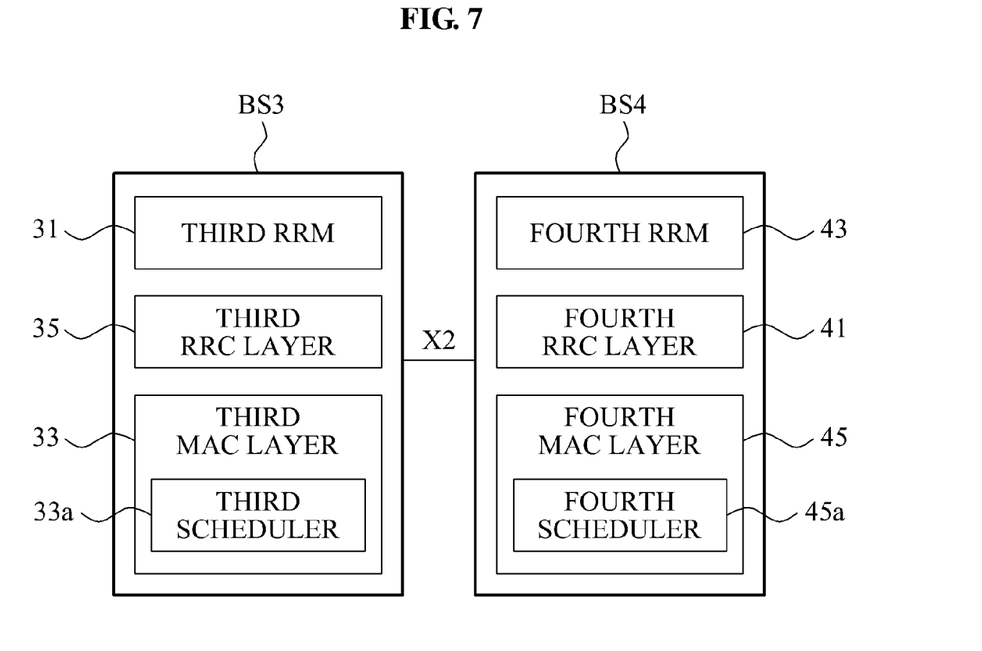
FIG. 7 is a block diagram illustrating a function division between a third base station and a fourth base station for operating a CoMP according to an embodiment of the present invention.

FIG. 7 is a block diagram illustrating a function division between a third base station (BS3) and a fourth base station (BS4) for operating a CoMP according to an embodiment of the present invention.

In FIG. 7, a function of the BS3 may be performed by the BS4, and a function of the BS4 may be performed by the BS3.

At all times from beginning, the BS1 of FIG. 2 may apply a scheduling policy to a UE according to an ICIC scheme. On the other hand, the BS3 of FIG. 7 may apply the scheduling policy without using the ICIC scheme in the beginning. Next, when a particular condition is satisfied, the BS3 may perform scheduling using the ICIC scheme, and may perform the PMI coordination described above with reference to FIG. 2.

For this, the BS3 of a serving cell may include a third RRM 31, a third MAC layer 33, and a third RRC layer 35. Each of base stations of neighboring cells may include a fourth RRC layer 41, a fourth RRM 43, and a fourth MAC layer 45. Hereinafter, description will be made based on the BS4 among the base stations of the neighboring cells.

When describing the BS3 and the BS4 of FIG. 7, description related to the same functions of the BS1 and the BS2 of FIG. 2 will be omitted here.

The third RRM 31 may determine a frequency boundary for dividing a cell into a central portion and an outer portion of a cell according to an FFR ICIC scheme, and may divide a frequency according to the frequency boundary.

A third scheduler 33a of the third MAC layer 33 may perform a scheduling policy with respect to a UE without considering a position of the UE and particular constraints. Accordingly, it is possible to increase a resource use rate, and to provide a relatively high QoS to the UE. Specifically, the third scheduler 33a may assign a currently available frequency or time, and the like to the UE. When a status of the UE satisfies a particular condition, the third scheduler 33a may modify the scheduling policy using the defined ICIC scheme.

According to an embodiment of the present invention, in a state where a service is being provided to a UE without particular constraints, when a status of the UE satisfies a particular condition, it is possible to apply the ICIC scheme to the UE. For example, the particular condition may indicate a rapid decrease of the average QoS of UEs existing in an outer portion of a single cell. Specifically, when a decrease rate of the average QoS of the UEs is greater than a reference value, it may satisfy the particular condition for performing the ICIC.

The third RRM 31 may calculate the average QoS of the UEs positioned within the cell, that is, the outer portion of the serving cell where the BS3 is positioned, and may determine whether gain occurs when the ICIC is performed in the serving cell, based on the calculated average QoS.

Specifically, the third RRM 31 may calculate the average QoS of the UEs positioned in the outer portion of the cell. When the calculated average QoS satisfies the particular condition, the third RRM 31 may determine the gain occurs when an ICIC algorithm operates in the serving cell. Examples of the gain may include a decrease in interference, an increase of the QoS, and the like.

When the third RRM 31 determines the gain occurs, the third RRC layer 35 may inquire each of base stations of neighboring cells about whether to initiate ICIC. Instead of inquiring about whether to use the particular resource, for example, the PMI, as described above with reference to FIG. 2, the third RRC layer 35 may inquire each of the base stations of the neighboring cells about whether to perform an FFR ICIC by using an X2 message.

Each of the base stations of the neighboring cells receiving the X2 message from the third RRC layer 35 may determine whether gain occurs in its corresponding cell, which is the same as the serving cell.

The fourth RRC layer 41 of the BS4 may receive, from the third RRC layer 35 of the BS3, the X2 message inquiring about whether to perform the ICIC, and may transfer the received X2 message to the fourth RRM 43.

Based on the received X2 message, the fourth RRM 43 may determine whether gain occurs when the ICIC is performed in its cell. When the gain is determined to occur, the fourth RRM 43 may notify the fourth RRC layer 41 and the fourth scheduler 45a about that the ICIC may start.

According to the notice from the fourth RRM 43, the fourth RRC layer 41 may transmit, to the third RRC layer 35 of the serving cell, a response that agrees with performing of the ICIC.

When the response is received from all the neighboring cells, the third RRC layer 35 of the serving cell may notify the third scheduler 33a about a modification of the scheduling policy.

When the third RRM 31 and the fourth RRM 43 determine that gain occurs when the ICIC is performed, the third MAC layer 33 may modify the scheduling policy by applying the ICIC. More specifically, the third scheduler 33a of the third MAC layer 33 may estimate position information of UEs positioned within the serving cell, and may assign, to each UE, a frequency divided according to the defined ICIC technology.

According to another embodiment of the present invention, when a particular situation such as a decrease in a QoS occurs while using a general scheduling policy, the BS3 may apply the ICIC scheme.

Also, the third RRM 31 may determine whether to perform the PMI coordination using two predetermined thresholds, for example, a QoS threshold and a CoMP threshold. When the PMI coordination is required, the third RRM 31 may request each of the base stations of the neighboring cells including, for example, the BS4 for the PMI coordination.

The fourth RRC layer 41 of the BS4 may receive, from the serving cell, PMI information to be used by the UE of the serving cell or PMI information requesting a refrain from using of a corresponding PMI.

The fourth RRM 43 may calculate a QoS expectation value by simulating a PMI coordination with respect to UEs positioned within a current cell based on the received PMI information. The fourth RRM 43 may determine whether to perform the PMI coordination based on the calculated QoS expectation value.

When the neighboring cells including the cell where the BS4 is positioned agree to perform the PMI coordination, the third RRM 31 may transfer the decision result to the third scheduler 33a. The third scheduler 33a may modify a scheduling policy of a UE set as a CoMP UE, based on the transferred decision result. The PMI coordination is described with reference to FIGS. 4 through 6, and thus further description related thereto will be omitted here.

Figure 8:
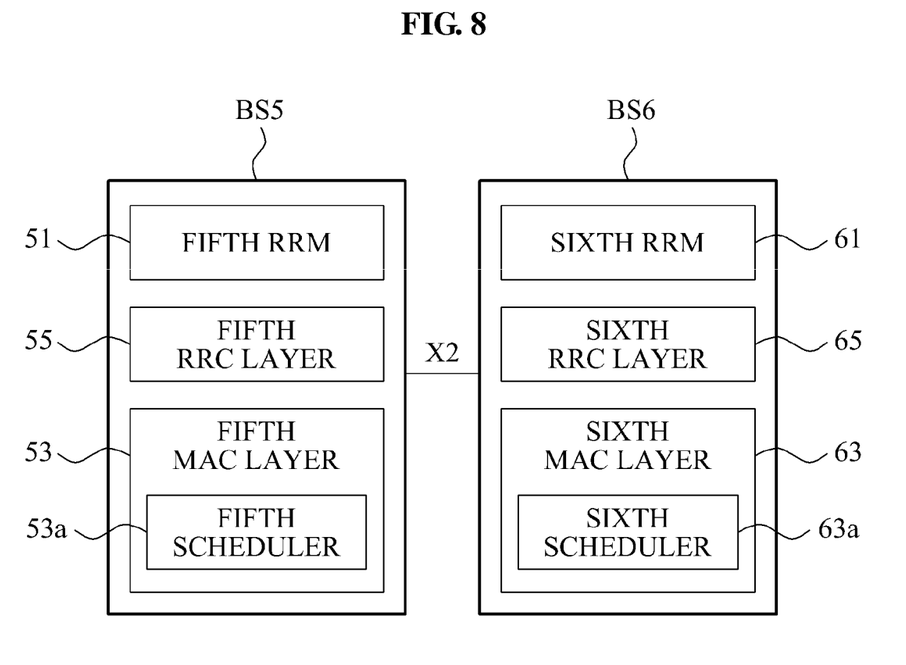
FIG. 8 is a block diagram illustrating a function division between a fifth base station and a sixth base station for operating a CoMP according to an embodiment of the present invention

FIG. 8 is a block diagram illustrating a function division between a fifth base station (BS5) and a sixth base station (BS6) for operating a CoMP according to an embodiment of the present invention.

In FIG. 8, a function of the BS5 may be performed by the BS6, and a function of the BS6 may be performed by the BS5.

At all times from beginning, the BS1 of FIG. 2 may apply a scheduling policy to a UE according to an ICIC scheme. On the other hand, the BS5 of FIG. 8 may perform scheduling by employing both the ICIC scheme and a PMI coordination from beginning providing a service.

Specifically, whenever the UE requests the service, the BS5 may verify position information of the UE and may assign a resource corresponding to the verified position information according to the ICIC scheme. The BS5 may calculate an optimal PMI that may maximize a QoS of the UE and cause least interference, and then may perform scheduling in interoperation with a neighboring cell. The BS5 recognizing the service request of the UE may determine an available frequency by verifying position information of the UE, and may determine an optimal PMI and notify a neighboring cell about the determined optimal PMI.

For this, the BS5 of a serving cell may include a fifth RRM 51, a fifth MAC layer 53, and a fifth RRC layer 55. The BS6 of a neighboring cell may include a sixth RRM 61, a sixth MAC layer 63, and a sixth RRC layer 65. When describing the BS5 and the BS6 of FIG. 8, description related to the same functions of the BS1 and the BS2 of FIG. 2 will be omitted here.

The fifth RRM 51 may determine a frequency boundary for dividing a cell into a central portion and an outer portion according to an FFR ICIC scheme, and may divide a frequency according to the frequency boundary.

A fifth scheduler 55a of the fifth MAC layer 53 may estimate position information of a UE within the cell, and may perform scheduling using a defined ICIC technology. Specifically, whenever the UE requests a service, the fifth scheduler 55a may estimate a position of the UE, and may assign, to the UE, a resource defined based on the estimated position, according to the ICIC scheme.

When a resource such as a frequency and the like to be used by the UE is determined according to the ICIC scheme, the fifth RRM 51 may determine optimal PMI information to be used by the UE. The optimal PMI information may be known by measuring a QoS of the UE for each PMI, or according to other known arts.

The fifth RRC layer 55 may transmit the determined optimal PMI information to each of base stations of neighboring cells using an X2 message. Hereinafter, description will be made based on the BS6 among the base stations of the neighboring cells.

The sixth RRC layer 65 of the BS6 may transfer the received X2 message to the sixth RRM 61. Whenever the UE of the serving cell requests a service, the sixth RRC layer 65 may receive, from the BS5 of the serving cell, optimal PMI information to be used by the user.

The sixth RRM 61 may determine whether to perform a PMI coordination based on the optimal PMI information of the X2 message. The sixth RRM 61 may calculate a QoS expectation value by simulating the PMI coordination with respect to UEs positioned within its cell based on the received optimal PMI information, and may determine whether to perform the PMI coordination based on the calculated QoS expectation value. When at least one of calculated QoS expectation values of the UEs is less than or equal to a reference value, the sixth RRM 61 may not perform the PMI coordination.

When the PMI coordination is determined to be performed, the sixth RRM 61 may transfer the decision result to the sixth scheduler 63*a*. Accordingly, the sixth scheduler 63*a* may modify a scheduling policy of a corresponding cell based on the optimal PMI information. It is described above with reference to FIGS. 4 through 6 and thus further description will be omitted.

When a response agreeing with a coordination using the optimal PMI is received from all the base stations of the neighboring cell including, for example, the BS6, the fifth RRC layer 55 may transfer the response to the fifth RRM 51 and the fifth RRM 51 may transfer the response to the fifth scheduler 53*a*. The fifth scheduler 53*a* may adjust the scheduling policy of the UE based on the transferred decision. For example, the fifth scheduler 53*a* may perform scheduling so that the UE may perform beamforming alignment using the optimal PMI.

When at least one of the base stations of the neighboring cells determines to not perform the PMI coordination, the PMI coordination for the UE of the BS5 may not be performed.

The above embodiments of the present invention may be separately configured, or may be configured in a single apparatus. For example, the embodiment described above with reference to FIG. 2 may be set to a first mode, and the embodiments described above with reference to FIGS. 7 and 8 may be set to a second mode and a third mode, respectively. A mode set by an operator or a mode most suitable for a circumstance may be selected and thereby be operated.

The aforementioned embodiments of the present invention may be applicable to a Long Term Evolution (LTE)-Advanced system or an International Mobile Telecommunication (IMT)-Advanced system.

According to embodiments of the present invention, it is possible to enhance a QoS of a UE positioned within an outer portion of a cell by adaptively employing since an ICIC technology and a PMI coordination to thereby mitigate inter-cell interference.

Also, according to embodiments of the present invention, since a CoMP is performed in an optimal environment in interoperation with a neighboring cell, it is possible to decrease inter-cell interference.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A base station for operating a Cooperative Multi-Points Transmission and Reception (CoMP), comprising:
    a first Radio Resource Manager (RRM) to determine a frequency boundary divided into a central portion and an outer portion of a cell according to an Inter-cell Interference Coordination (ICIC) scheme; and
    a first Media Access Control (MAC) layer to estimate position information of a user equipment, and to assign, to the user equipment, a frequency band divided according to the ICIC scheme,
    wherein when a quality of service (QoS) of the user equipment decreases to be less than or equal to a predetermined threshold, the first RRM determines a Precoding Matrix Index (PMI) coordination for the user equipment.

2. The base station of claim 1, further comprising:
    a first Radio Resource Control (RRC) layer to receive, from the first RRM, a notice that the PMI coordination is determined to be performed, and to transmit PIM information to be used by the user equipment to each of base stations included in neighboring cells of the cell.

3. The base station of claim 2, wherein when each of the base stations included in the neighboring cells determines to perform the PMI coordination, the first MAC layer adjusts a scheduling policy associated with a resource to be used by the user equipment.

4. The base station of claim 1, wherein the first RRM determines whether to perform the PMI coordination by comparing a QoS threshold used to determine the QoS with a CoMP threshold used to prevent the QoS from decreasing to be less than or equal to the QoS threshold.

5. A base station for operating a CoMP, comprising:
    a third MAC layer to assign a frequency to all the user equipments positioned within a cell;
    a third RRM to calculate an average QoS of user equipments positioned in an outer portion of the cell, and to determine, based on the calculated average QoS, whether gain occurs when an ICIC is performed in the cell; and
    a third RRC layer to control the third MAC layer to adjust the scheduling policy by applying the ICIC when the gain is determined to occur.

6. The base station of claim 5, wherein when the third RRM determines the gain occurs, the third RRC layer inquires base station positioned around the cell about whether to perform the ICIC.

7. The base station of claim 5, wherein when a QoS of one of the user equipments decreases to be less than or equal to a predetermined threshold after performing the ICIC, the third RRM determines to perform a PMI coordination.

8. The base station of claim 7, wherein:
    when an agreement with respect to the PMI coordination is received from a neighboring cell of the cell, the third MAC layer adjusts a scheduling policy associated with a resource to be used by the user equipments.

* * * * *